(12) United States Patent
Alexander et al.

(10) Patent No.: US 8,793,647 B2
(45) Date of Patent: Jul. 29, 2014

(54) EVALUATION OF GRAPHICAL OUTPUT OF GRAPHICAL SOFTWARE APPLICATIONS EXECUTING IN A COMPUTING ENVIRONMENT

(75) Inventors: Stefan Alexander, Boeblingen (DE); Rene Pietzsch, Leipzig (DE); Sebastian Schaefer, Boeblingen (DE); Andreas Trinks, Boeblingen (DE); Henning Wilbert, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 13/400,238

(22) Filed: Feb. 20, 2012

(65) Prior Publication Data
US 2012/0224745 A1    Sep. 6, 2012

(30) Foreign Application Priority Data

Mar. 3, 2011 (EP) ..................... 11156723

(51) Int. Cl.
*G06F 9/445* (2006.01)
(52) U.S. Cl.
USPC ........................... 717/105; 717/109; 717/110
(58) Field of Classification Search
None
See application file for complete search history.

(56) References Cited

U.S. PATENT DOCUMENTS

| 6,138,270 | A | 10/2000 | Hsu | |
|---|---|---|---|---|
| 2008/0263012 | A1* | 10/2008 | Jones | 707/3 |
| 2010/0131927 | A1 | 5/2010 | Pinjala | |

FOREIGN PATENT DOCUMENTS

JP    2007087161 A    5/2007

OTHER PUBLICATIONS

Takahashi, Juichi, "An Automated Oracle for Verifying GUI Objects", Software Engineering Notes, Jul. 2001, p. 83, vol. 26, No. 4, ACM SIGSOFT.
Weihua Huang, Chew Lim Tau and Wee Kheng Leow, "Model-based Chart Image Recognition", pdf.aminer.org/000/236/519/model_based_chart_image_recognition.pdf. (no indication that this article was published anywhere other than on the Internet).
Tsung-Hsiang Chang, Tom Yeh and Robert C. Miller, "GUI Testing Using Computer Vision", groups.csail.mid.edu/iud/projects/sikuli-chi2010.pdf (no indication that this article was published anywhere other than on the Internet).
Brad L. Chisholm, "Automated Testing of SAS System GUI Applications", http://www2.sas.com/proceedings/sugi22/APPDEVEL/PAPER10.PDF. (no indication that this article was published anywhere other than on the Internet).

* cited by examiner

*Primary Examiner* — Chuck Kendall
(74) *Attorney, Agent, or Firm* — Steven L. Nichols; Van Cott, Bagley, Cornwall & McCarthy P.C.

(57) ABSTRACT

Graphic objects generated by a software application executing in a computing environment are evaluated. The computing environment includes a graphical user interface for managing I/O functions, a data storage device for storing computer usable program code and data, and a data processing engine in communication with the graphical user interface and the data storage device The data processing engine receives and processes origin data from the data storage device to produce projected values for data points in the graphic image intended to be displayed. The data processing engine also creates and processes a snapshot of the displayed graphic object to produce actual values of data points in the displayed graphic object, compares the projected values to the actual values, and outputs an indication of the degree of similarity between the intended graphic object and the displayed graphic object.

20 Claims, 5 Drawing Sheets

EVALUATION OF GRAPHICAL OUTPUT OF GRAPHICAL SOFTWARE APPLICATIONS EXECUTING IN A COMPUTING ENVIRONMENT

BACKGROUND

The present invention relates generally to evaluating software applications, and more particularly to evaluating displayed graphic objects produced by software applications when those application execute in a computing environment.

BRIEF SUMMARY OF THE INVENTION

The invention may be implemented as a method performed in a test computer for evaluating a displayed graphic object generated by an executing software application. Origin data is received defining the graphic object to be displayed and projected values of data points in the defined graphic object are calculated. A snapshot of the graphic object as actually displayed is captured and actual values of data points in the displayed graphic object are extracted from the snapshot. Projected data point values and corresponding actual data point values are compared. An indication of the similarity of the displayed graphic object to the defined graphic object is output.

The invention may also be implemented as a computer program product including a computer usable medium embodying computer usable program code for, when executed in a computer, evaluating a displayed graphic object generated by an executing software application. Computer usable program code causes origin data to be received defining the graphic object to be displayed and then calculates projected values of data points in the defined graphic object. Other computer usable program code captures a snapshot of the graphic object actually displayed and extracts actual values of data points from the snapshot. Still other computer usable program code compares projected and actual values of corresponding data points and outputs an indication of the similarity of the displayed graphic object to the defined graphic object.

Further, the invention may be implemented as a computer-implemented system for evaluating a displayed graphic object generated by a software application executing in a computing environment. The computer-implemented system includes a graphical user interface capable of displaying graphic objects to be evaluated, a data storage device for storing computer usable program code and data needed to generate and to evaluate a graphic object, and a data processing engine in communication with the graphical user interface and the data storage device. The data processing engine receives and processes data from the data storage device to produce projected values for data points in the graphic object to be displayed. The data processing engine also captures and processes a snapshot of the actually displayed graphic object to produce actual values for data points in the displayed graphic object. The data processing engine compares projected values with corresponding actual values and outputs an indication of the similarities between the defined graphic object and the actually displayed graphic object.

DETAILED DESCRIPTION

Figure 1:
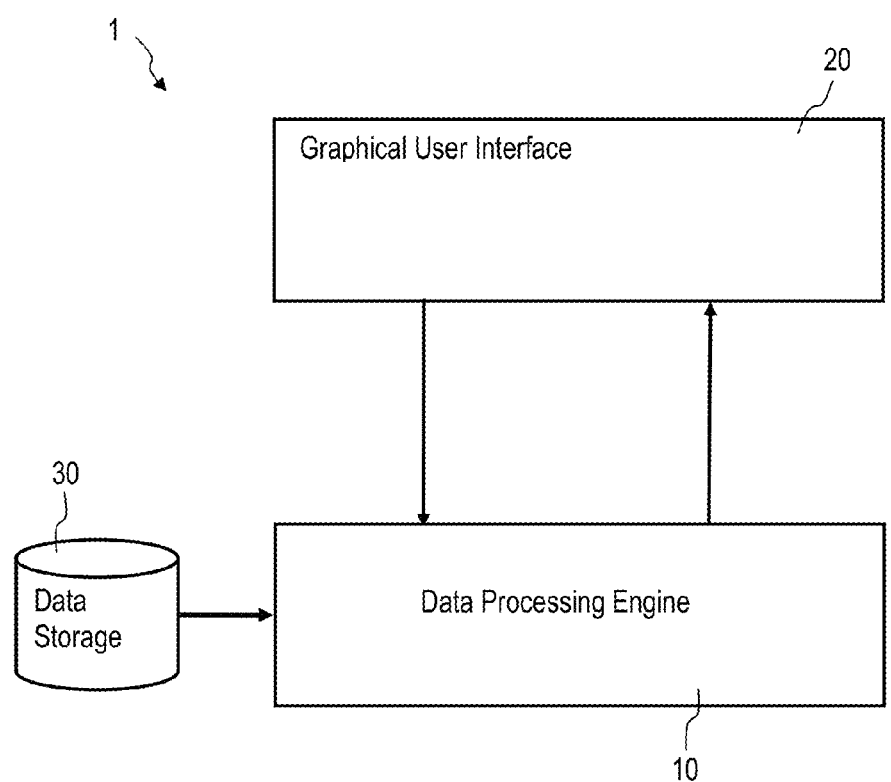
FIG. 1 is a schematic diagram of a computing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
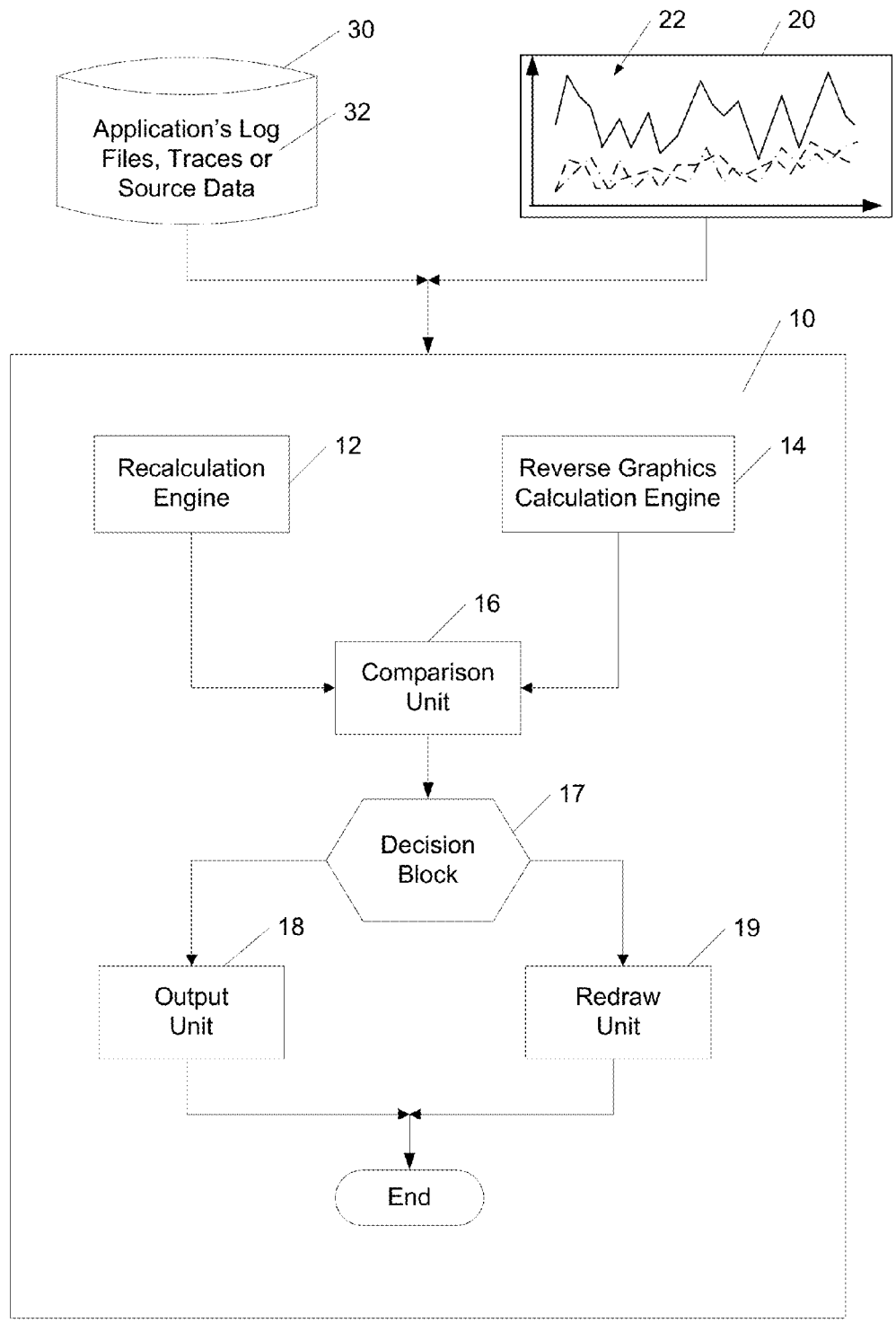
FIG. 2 is a schematic block diagram of a system for evaluating a displayed graphic object generated by a software application executing in the computing environment shown in FIG. 1, in accordance with an embodiment of the present invention.

FIG. 1 shows a computing environment 1, in accordance with an embodiment of the present invention. FIG. 2 shows a system for evaluating a displayed graphic object generated by a software application executing in the computing environment 1 shown in FIG. 1.

Referring to FIGS. 1 and 2, the illustrated embodiment of the present invention employs a system for evaluating a displayed graphic object generated by a software application executing in a computing environment 1 that includes a graphical user interface 20 for managing I/O functions of the system and a data storage device 30 for storing computer usable program code and needed data, such as log files, trace files or source data required by a graphic user interface application. The computing environment further includes a data processing engine 10 in communication with graphical user interface 20 and with the data storage device 30.

According to the present invention the data processing engine 10 receives origin data from the data storage device 30 defining a graphic object to be displayed and processes that data to calculate projected values of data points in the defined graphic; causes a snapshot of the displayed graphic object to be captured and, using the snapshot, extracts actual values of data points in the displayed graphic object. The data processing engine 10 compares the actual values of data points in the displayed graphic object to projected values of corresponding data points and outputs an indication of the similarity between the displayed graphic object and the defined graphic object.

If the actual values of the data points for the displayed graphic object are within a configurable threshold range of the projected values of the corresponding data points for the defined graphic object, data processing engine 10 outputs a "pass" indicator. If the actual values fall outside the configurable threshold range, data processing engine 10 outputs a "fail" indicator. When the compare operation results in a "fail", data processing engine 10 redraws the defined graphic object based on the projected values of data points and the displayed graphic object based on actual values of data points to provide a visual output that shows the differences that resulted in the "fail" indicator.

Referring to FIG. 2, the data processing engine 10 comprises a recalculation engine 12 to establish projected values for the graphic object to be displayed based on origin data, a reverse graphics calculation engine 14 to capture displayed graphics 22 and to determine actual values for data points in the captured graphics, a comparison unit 16 to normalize values and to perform compares between projected and actual values of corresponding data points, a decision block 17 to decide if the compares are within a predetermined threshold range, an output unit 18 which generates a "pass" indicator if the compares are within the predetermined threshold range and a redraw unit 19 to redraw defined and displayed graphic objects while highlighting differences between the two.

The recalculation engine 12 calculates projected values for data points for for defined graphic objects 22 using origin data from difference sources, including data extracted from product log files, traces, or other sources. The data used could be also a set of provided source data, e.g. if it is intended to force a specific curve or graphic by performing activities which would need to result in a particular displayed graphic 22. Typically, the recalculation engine 12 parses log files or traces for messages or data blocks. Messages normally contain general information about an overall event to be displayed in a diagram. Data blocks normally consist of detailed information about the event in overall or portions of it which should be displayed in the diagram. Based on product specific rules or filters, the source data will be just extracted or interpreted and finally stored in arrays or lists representing x and y coordinates of the displayed graphic 22.

Additionally, based on predefined rules, the recalculation engine 12 can extract multiple log files in a combined approach to, for example, merge different lines and/or curves into the same line diagram. The amount of information and/or objects differs depending on duration and/or the number of events to be displayed in the graphic 22.

Depending on the extracted values (x and y coordinates) and whether the extracted values can be used directly to redraw and/or recreate final graphic 22, an additional optional recalculation algorithm may be implemented in the recalculation engine 12 to get extracted values recalculated to final values used for the graphic 22 without relying on code of the graphic user interface application to be tested. Since this step is product dependent, the complexity of the recalculation algorithm might differ based on the software application to be tested.

Normally the location of a graphic 22 is dynamic since the position of the graphic 22 within a given product window can change and/or the window itself may be resized or the window may appear at different locations on the screen. The reverse graphics calculation engine 14 must obtain the coordinates of the graphic 22 itself to capture a snapshot of the graphic 22. To employ a dynamic approach to obtain the coordinates of the graphic 22, the reverse graphics calculation engine 14 either relies on features of existing graphic user interface based test tools such as Rational Functional Tester, which can recognize and return coordinates of a graphical object, in this case the graphic 22 to be evaluated, or use a self-implemented mechanism, which covers those cases where an existing test tool is not able to provide meaningful coordinates. In such cases the reverse graphics calculation engine 14 orients on other objects and the known position of the graphic 22 in relation to others.

Figure 4:
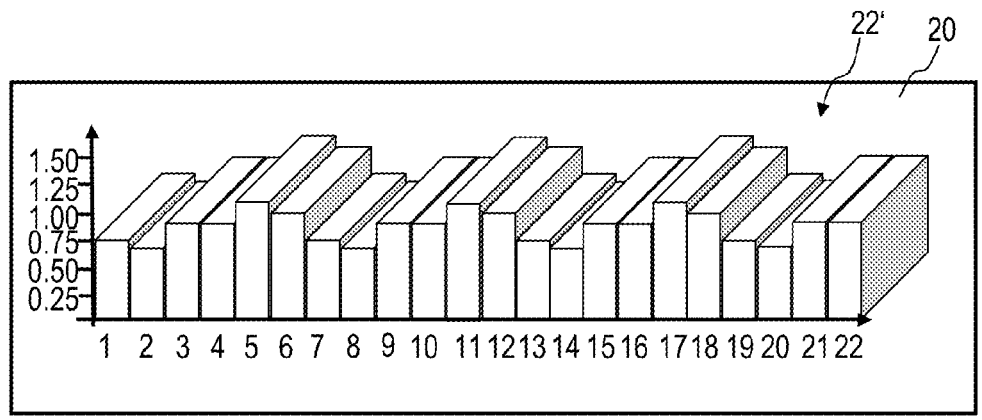
FIG. 4 is a first screenshot which will be used to capture actually displayed data.

Based on provided coordinates the reverse graphics calculation engine 14 takes a screenshot of the specified screen and/or window area only, as shown in bar diagram 22' of FIG. 4, for example.

To recognize the content of the screenshot or captured image of the displayed graphic, the reverse graphics calculation engine 14 scans for predefined values of colors on a pixel base to recognize curves or bars or diagram, for example. First the reverse graphics calculation engine 14 looks for a zero point (x=0, y=0) and moves the zero point of the graphic 22' to the lower left corner of the graphic. By doing so all information outside the coordinate system can be dropped. This prevents unneeded objects from interfering with calculations, which makes it easier to convert data from the files into coordinates at a later step.

Figure 5:
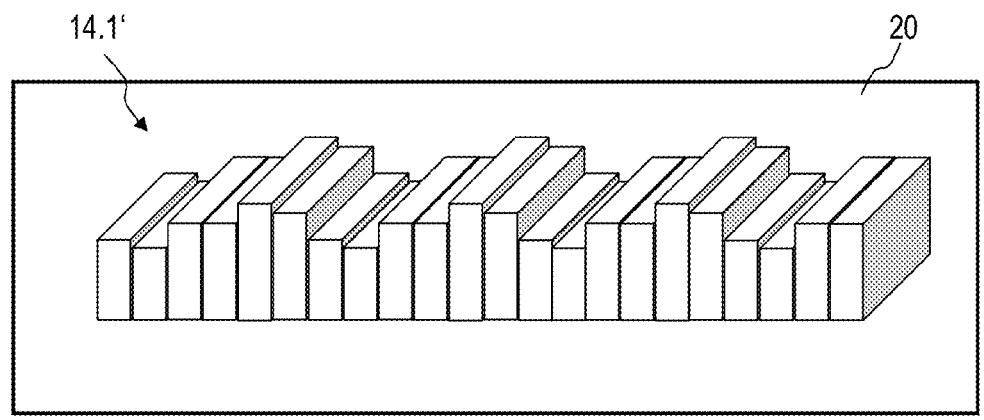
FIG. 5 is a graphical demonstration of scanned/recognized values of the first screenshot of FIG. 4.

For bar and line diagrams, different methods are used. Several iterations are performed comparing the color value of a pixel with a predefined color table. In an appropriate color table, RGB values are defined based on diagram type to specify the expected colors of curves or bars. Found coordinates of curves will be stored in an array in such a way that the complete course of a curve can be recreated during an evaluation phase. For bar diagrams the reverse graphics calculation engine 14 looks for color of the frame 14.1' of the bars to store the dimensions of the bars as indicated and graphically demonstrated in FIG. 5. These dimensions and the color value of the bars will also be stored in a sorted list.

At the end of this step in case of bar diagrams, the position, size, and color of each recognized bar are stored in corresponding data structures. In case of line diagrams, various curves, i.e. a list of coordinate objects, are stored in corresponding data structures.

Further, the reverse graphics calculation engine 14 performs a pre-validation of the captured content to determine whether captured values make sense. For a line diagram it is not valid to have two different y coordinates for the same x coordinate of the same line, since this would mean that the line is doing a loop which is supposed not to be valid, for example. In such case the evaluation of the graphic is ended.

The evaluation and comparison unit 16 recreates the intended graphic 22, 22' based on the information provided and/or extracted from log files and compares it with recognized data extracted from snapshots.

Generally, for line diagrams, the comparison unit 16 requires more information to be extracted from log files to get a usable evaluation of the displayed graphics 22, 22'. To be able to compare the data extracted from log files to scanned data resulting from the capture, the comparison unit 16 standardizes information to a comparable base. To standardize projected and actual values of data points, the evaluation and comparison unit 16 looks for the highest captured x- and y-coordinates, for example, and compares them with the highest x- and y-coordinates of extracted log files to obtain a factor applicable in all of the subsequent compare operations.

Additionally or alternatively, the comparison unit 16 uses the highest marks on the x- and y-axes and assumes this marks represent 100% to determine a factor between the highest x- and y-coordinates of the extracted log files. Working with of all the available and extracted information from the log file, the comparison unit 16 performs comparison with scanned values while considering the factor determined in the step before.

For bar diagrams, fewer projected and actual values are needed since the size of a bar is constant over its width. After evaluating the amount of different rows of numbers using same value of color and double checking with the amount of different rows of numbers extracted out of the log files the evaluation and comparison unit 16 is standardizing the data of both sources against each other. Additionally to the approaches mentioned for line diagrams it is also a valid option to make the baseline setting by calculating the average value of all the available y-coordinates of the extracted log data and compare it with the average value of all the scanned y-coordinates. If this approach of standardization is used only relative differences between the current y-coordinate and the average value will be used for the comparison operations by also considering the determined standardization factor.

Since graphics do have rounding errors due to grids of pixels the decision block 17 defines two different kinds of thresholds. If the recalculated and compared value hits a first threshold, a warning is written to the evaluation log file. If the recalculated and compared value also hits a second value, the comparison result of the graphic will be marked as failed.

For icons and simple graphics, it is not required to extract and scan for source data. In this case it is enough to limit the comparison operations to verify only a set of characteristic points inside the icon and double check that they met the right color values (RGB). This means that for each specific icon or simple graphic a list and/or array of coordinates and color values are predefined.

Figure 6:
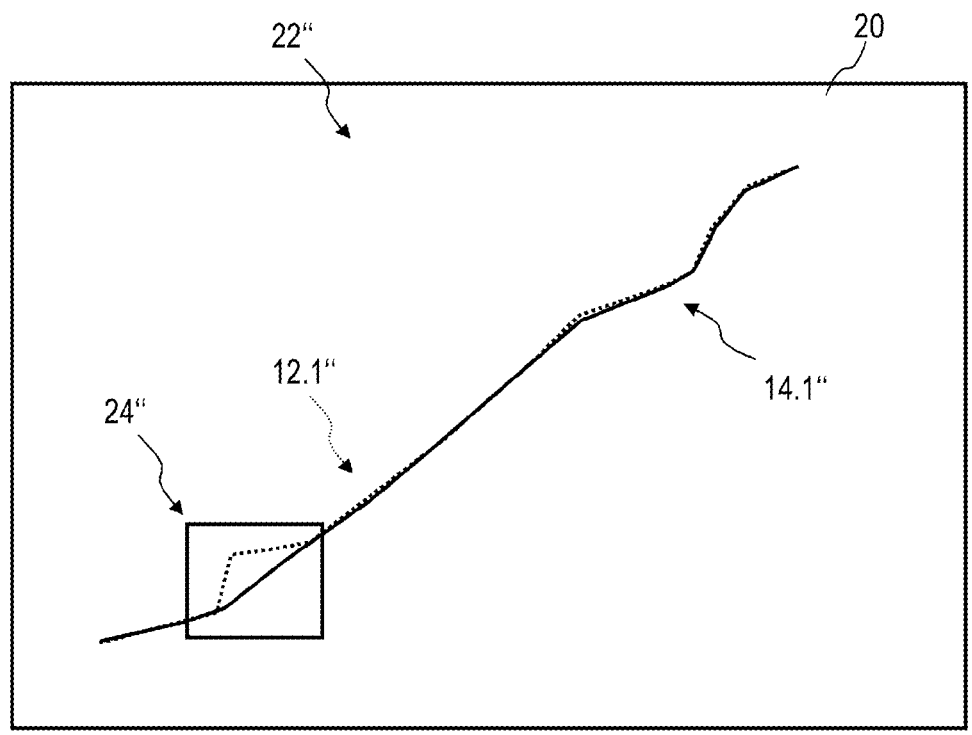
FIG. 6 is graphical output depicting visually identified differences between projected values of data points for a defined graphic object and actual values of corresponding data points extracted from a snapshot of the displayed graphic object.

In case of at least one of the second defined thresholds has been exceeded by a compare operation of all the available coordinates the redraw unit 19 redraws both sources of information, i.e. the scanned information 14.1" and the extracted information 12.1" in a new graphic 22", shown in FIG. 6. Additional the redraw unit 19 marks detected differences with a rectangle 24".

By doing so it is very easy for the tester to identify the differences and to see which content has been extracted and reconstructed from information in the log files and which data has been scanned from snapshots of the displayed graphic. In case of a wrong extraction and/or recalculation or a wrong scan it is also easy to identify the origin of the failed comparison and to decide if adjustments in either the recalculation algorithm or the color table used to recognize values need to be extended by toleration colors. In the shown example the recalculated correct information line 12.1" and the extracted information line 14.1" have different values inside the difference window 24".

Figure 3:
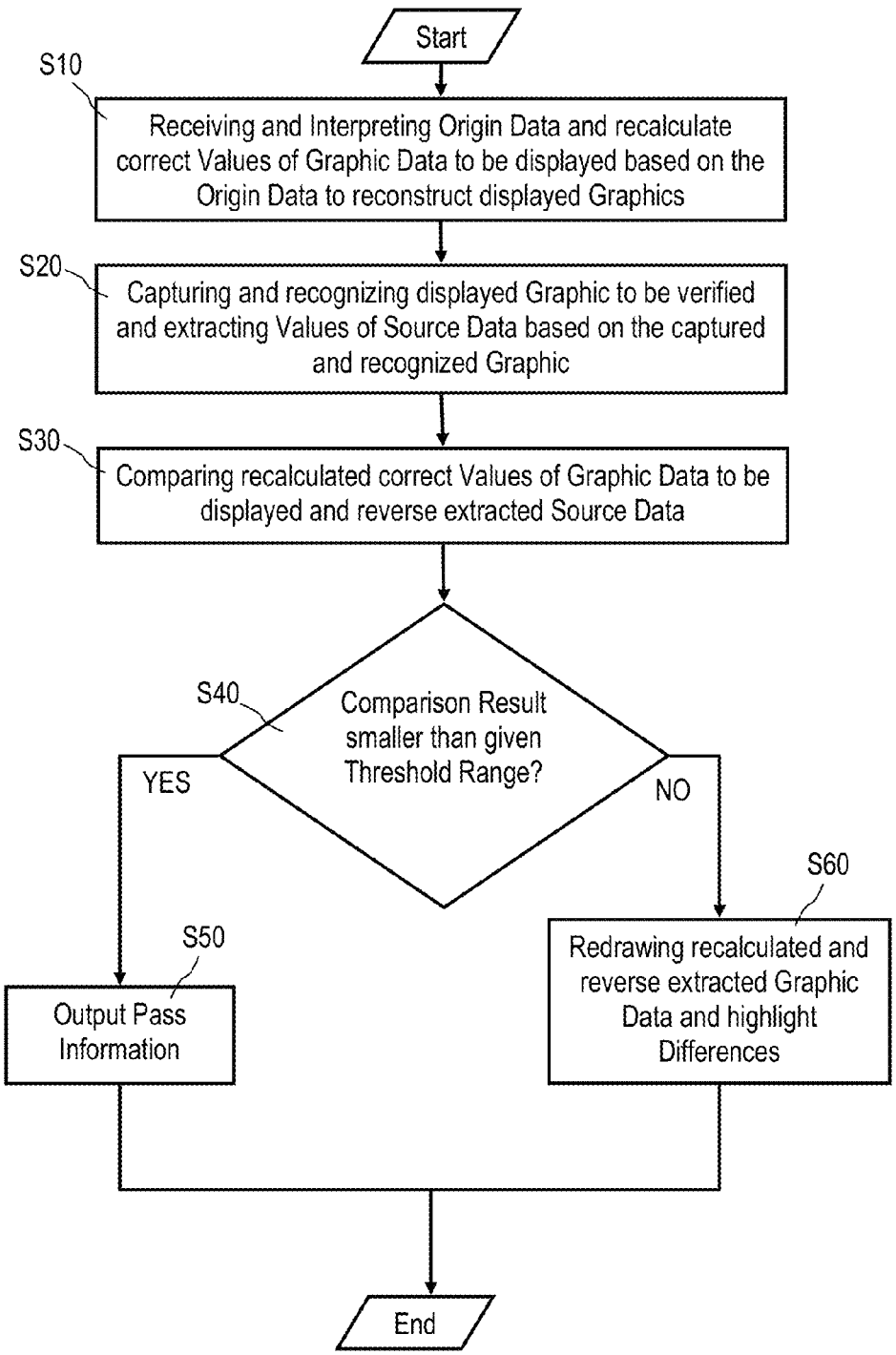
FIG. 3 is a flow chart of a method of evaluating a displayed graphic object generated by the software application, in accordance with an embodiment of the present invention.

FIG. 3 shows a method of evaluating a graphic object generated by a software application, in accordance with an embodiment of the present invention.

Referring to FIG. 3, the shown embodiment of the present invention employs a method of evaluating a graphical object generated by a graphical software application executing in a computing environment 1. In step S10, origin data defining a graphic object are retrieved. As previously noted, the origin data may come from product log files, traces, source data, and/or data out of simulated and/or forced courses. Based on the origin data, projected values of data points in the graphic object to be displayed are calculated. In step S10, log files or traces may be parsed at least for messages containing general information about overall events to be displayed or data blocks consisting detailed information about the event in overall or in portions to be displayed, for example, wherein the source data are extracted or interpreted and stored in arrays or lists representing x and y coordinates of a graphic object.

In step S20, a displayed graphic object 22 to be evaluated is captured and scanned. To capture the displayed graphic a snapshot may be created. Based on the captured and scanned graphic object 22, actual values of data points in the displayed graphic object are extracted. The process of creating the snapshot comprises evaluating coordinates of the graphic itself by using existing graphical user interface based test tools or by using a self-implemented mechanism orientating on other objects and known position of the graphic in relation to others, for example. During scanning for predefined values of colors on a pixel base, a line diagram, an area diagram, a bar diagram and/or an icon may be recognized. In case of an area diagram, a bar diagram, and an icon, information specifying the position, size and color of each recognized area, bar, and icon is stored. In the case of a line diagram, information about at least one curve is stored as a list of coordinate objects or data points.

In step S30 projected values of data points on a graphic object and actual values of corresponding data points on the displayed graphic object are compared. Query S40 branches to step S50 if the comparison result is smaller than a given threshold range, and branches to step S60 if the comparison result is equal to or greater than a given threshold range. Based on the comparison, pass information or failure information is outputted. Before the comparison process is performed, the projected values of data points and the actual values of corresponding data points in the displayed graphic object are standardized to same ratio and/or range. To standardize the projected and actual values, the following steps may be performed. Looking for highest actual x- and y-coordinates and highest projected x- and y-coordinates and comparing the extracted with the recalculated coordinates will determine a factor used to apply with all subsequent compare operations.

Additionally or alternatively, to standardize the projected values and the actual values of corresponding data points, the following steps may be performed, for example: looking for highest marks on x and y axes, assuming the marks as 100% values, and determining a corresponding factor between the projected and the actual coordinates to apply with all subsequent compare operations.

In step S50, a pass indicator is output as long as compared projected values and actual values are within the configurable threshold range, otherwise failure information is outputted in step S60. In step S60 the graphic object is redrawn using both projected and actual data point values and identified differences are visually output as failure information.

The inventive method of evaluating a graphical output of a graphical software application can be implemented as an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method of evaluating a displayed graphic object generated by a software application executing in a computing environment, said method being performed in a test computer and comprising:
   receiving origin data defining the graphic object to be displayed;
   calculating projected values of data points in the graphic object defined by the received origin data;
   capturing a snapshot of the graphic object actually displayed on a computer display when the software application executes in the computing environment;
   extracting, from the snapshot, actual values of data points in the displayed graphic object;
   comparing the actual values of data points in the displayed graphic object to projected values of corresponding data points in the defined graphic object; and
   based on the results of the comparison, outputting an indication of the degree of similarity between the actually displayed graphic object and the graphic object defined by the received origin data.

2. The computer-implemented method according to claim 1, wherein a pass indication is output if the compared actual values and projected values are within a threshold range and a fail indication is output if the compared actual values and projected values fall outside the threshold range.

3. The computer-implemented method according to claim 1, further comprising producing a graphical representation of the differences between the compared actual values and projected values.

4. The computer-implemented method according to claim 1, wherein said origin data comprises data from at least one of: product log files, traces, and source data.

5. The computer-implemented method according to claim 4, wherein said log files or traces are parsed at least for messages containing general information about overall events to be displayed or data blocks consisting detailed information about said events in overall or in portions to be displayed, to acquire data representing x- and y-coordinates of a graphical object.

6. The computer-implemented method according to claim 1, wherein capturing a snapshot of a displayed graphic object comprises evaluating coordinates of said graphic object using features of existing test tools or a self-implemented mechanism orientating on other objects and a known position of said graphic object in relation to other objects.

7. The computer-implemented method according to claim 1, wherein said projected values of and said actual values of corresponding data points are standardized to same ratio and/or range before comparison.

8. A computer program product comprising a computer usable storage medium having computer usable program code embodied therewith, said computer usable program code when executed in a computer causing the computer to evaluate a displayed graphic object generated by a software application executing in a computing environment, said computer usable program code comprising:
   computer usable program code for receiving origin data defining the graphic object to be displayed;
   computer usable program code for calculating projected values of data points in the graphic object defined by the received origin data;
   computer usable program code for capturing a snapshot of the graphic object actually displayed on a computer display when the software application executes in the computing environment;
   computer usable program code for extracting, from the snapshot, actual values of data points in the displayed graphic object;
   computer usable program code for standardizing said projected values of and said actual values of corresponding data points;
   computer usable program code for comparing the actual values of data points in the displayed graphic object to projected values of corresponding data points in the defined graphic object;
   computer usable program code for, based on the results of the comparison, outputting a pass indication if the compared actual values and projected values are within a first threshold range and outputting a fail indication if the compared actual values and projected values fall outside the first threshold range; and
   computer usable program code for, based on the results of the comparison, outputting an indication of the degree of similarity between the actually displayed graphic object and the graphic object defined by the received origin data, wherein the indication of the degree of similarity comprises a graphical representation of the differences between the compared actual values and the projected values.

9. The computer program product according to claim 8, wherein said origin data comprises data from at least one of: product log files, traces, and source data.

10. The computer program product according to claim 9, wherein said log files or traces are parsed at least for messages containing general information about overall events to be displayed or data blocks consisting detailed information about said events in overall or in portions to be displayed, to acquire data representing x- and y-coordinates of a graphical object.

11. The computer program product according to claim 8, wherein computer usable program code for capturing a snapshot of a displayed graphic object further comprises computer program product for evaluating coordinates of said graphic object using features of existing test tools or a self-implemented mechanism orientating on other objects and a known position of said graphic object in relation to other objects.

12. A computer-implemented system for evaluating a displayed graphic object generated by a software application executing in a computing environment, said system comprising:
   a graphical user interface for displaying graphic objects to be evaluated;

a data storage device for storing computer usable program code and data needed to generate and evaluate a displayed graphic object; and a data processing engine in communication with said graphical user interface and said data storage device, said data processing engine receiving data from said data storage device and processing said data to produce projected values for data points in the graphic object to be displayed, creating and processing a snapshot of the displayed graphic object to be evaluated to produce actual values for data points in the displayed graphic object, comparing projected values of data points in the graphic object intended to be displayed to actual values of corresponding data points in the displayed graphic object, and outputting an indication based on the degree of similarities between the graphic object intended to be displayed to the graphic object actually displayed.

13. The computer-implemented system according to claim 12, wherein said data processing engine outputs a pass indication if the compared actual values and projected values are within a threshold range and a fail indication is output if the compared actual values and projected values fall outside the threshold range.

14. The computer-implemented system according to claim 12, wherein said data processing engine further produces a graphical representation of the differences between the compared actual values and projected values.

15. The computer-implemented system according to claim 12, wherein said data comprises data from at least one of: product log files, traces, and source data.

16. The computer-implemented system according to claim 15, wherein said log files or traces are parsed at least for messages containing general information about overall events to be displayed or data blocks consisting detailed information about said events in overall or in portions to be displayed, to acquire data representing x- and y-coordinates of a graphical object.

17. The computer-implemented system according to claim 12, wherein capturing a snapshot of a displayed graphic object comprises evaluating coordinates of said graphic object using features of existing test tools or a self-implemented mechanism orientating on other objects and a known position of said graphic object in relation to other objects.

18. The computer-implemented method according to claim 1, wherein the snapshot is a screen shot of a specified screen.

19. The computer-implemented method according to claim 1, further comprising pre-validating the actual values of data points in the displayed graphic object.

20. The computer program product according to claim 8, further comprising computer usable program code for writing a warning to an evaluation log file if the compared actual values and projected values fall outside a second threshold range, in which the second threshold range is less than the first threshold range.

* * * * *